(12) United States Patent
Yang et al.

(10) Patent No.: US 8,176,404 B2
(45) Date of Patent: May 8, 2012

(54) SYSTEMS AND METHODS FOR STEPPED DATA RETRY IN A STORAGE SYSTEM

(75) Inventors: Shaohua Yang, Santa Clara, CA (US); Weijun Tan, Longmont, CO (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 440 days.

(21) Appl. No.: 12/556,145

(22) Filed: Sep. 9, 2009

(65) Prior Publication Data
US 2011/0060973 A1    Mar. 10, 2011

(51) Int. Cl.
*G11C 29/00* (2006.01)

(52) U.S. Cl. ........................................ 714/805; 714/812

(58) Field of Classification Search .................. 710/107, 710/108; 714/755, 765, 799, 807, 805, 812
See application file for complete search history.

(56) References Cited

U.S. PATENT DOCUMENTS

| | | | |
|---|---|---|---|
| 5,222,069 A * | 6/1993 | Chevalley ..................... 714/765 |
| 5,278,846 A | 1/1994 | Okayama et al. |
| 5,325,402 A | 6/1994 | Ushirokawa |
| 5,392,299 A | 2/1995 | Rhines et al. |
| 5,513,192 A | 4/1996 | Janku et al. |
| 5,612,964 A | 3/1997 | Haraszti |
| 5,701,314 A | 12/1997 | Armstrong et al. |
| 5,717,706 A | 2/1998 | Ikeda |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,097,764 A | 8/2000 | McCallister et al. |
| 6,216,251 B1 | 4/2001 | McGinn |
| 6,266,795 B1 | 7/2001 | Wei |
| 6,317,472 B1 | 11/2001 | Choi et al. |

(Continued)

FOREIGN PATENT DOCUMENTS
WO    WO 2006/016751    2/2006

(Continued)

OTHER PUBLICATIONS

Vasic, B., "High-Rate Low-Density Parity-Check Codes Based on Anti-Pasch Affine Geometries," Proc ICC 2002, pp. 1332-1336.

(Continued)

*Primary Examiner* — David Ton
(74) *Attorney, Agent, or Firm* — Hamilton, DeSanctis & Cha

(57) ABSTRACT

Various embodiments of the present invention provide systems and methods for data processing retries. As an example, a data processing retry circuit is discussed that includes a stepped erasure window register, and an erasure flag set circuit. The stepped erasure window register includes: an erasure flag location, an erasure flag length, and a step size. The erasure flag set circuit is operable to assert a first erasure flag beginning at the erasure flag location and having the erasure flag length at a first time. In addition, the erasure flag set circuit is operable to assert a second erasure flag beginning at the erasure flag location plus the step size, and having the erasure flag length at a second time.

20 Claims, 6 Drawing Sheets

U.S. PATENT DOCUMENTS

| | | |
|---|---|---|
| 6,351,832 B1 | 2/2002 | Wei |
| 6,377,610 B1 | 4/2002 | Hagenauer et al. |
| 6,438,717 B1 | 8/2002 | Butler et al. |
| 6,473,878 B1 | 10/2002 | Wei |
| 6,625,775 B1 | 9/2003 | Kim |
| 6,633,936 B1 * | 10/2003 | Keller et al. .................. 710/107 |
| 6,671,404 B1 | 12/2003 | Kawatani et al. |
| 6,697,899 B1 * | 2/2004 | Kasuga .......................... 710/108 |
| 6,748,034 B2 | 6/2004 | Hattori et al. |
| 6,757,862 B1 | 6/2004 | Marianetti |
| 6,788,654 B1 | 9/2004 | Hashimoto et al. |
| 6,810,502 B2 | 10/2004 | Eidson |
| 6,986,098 B2 | 1/2006 | Poeppelman |
| 7,010,051 B2 | 3/2006 | Murayama et al. |
| 7,047,474 B2 | 5/2006 | Rhee et al. |
| 7,058,873 B2 | 6/2006 | Song et al. |
| 7,093,179 B2 | 8/2006 | Shea |
| 7,184,486 B1 | 2/2007 | Wu et al. |
| 7,191,378 B2 | 3/2007 | Eroz et al. |
| 7,203,887 B2 | 4/2007 | Eroz et al. |
| 7,237,173 B2 * | 6/2007 | Morita et al. ................. 714/755 |
| 7,257,764 B2 | 8/2007 | Suzuki et al. |
| 7,310,768 B2 | 12/2007 | Eidson et al. |
| 2004/0098659 A1 | 5/2004 | Bjerke et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0140311 A1 | 6/2006 | Ashley et al. |
| 2006/0168493 A1 | 7/2006 | Song et al. |
| 2006/0195772 A1 | 8/2006 | Graef et al. |
| 2006/0248435 A1 | 11/2006 | Haratsch |
| 2007/0011569 A1 | 1/2007 | Casado et al. |
| 2007/0047635 A1 | 3/2007 | Stojanovic et al. |
| 2007/0277083 A1 * | 11/2007 | Van Acht et al. ............. 714/807 |
| 2007/0286270 A1 | 12/2007 | Huang et al. |
| 2008/0049825 A1 | 2/2008 | Chen et al. |
| 2008/0168330 A1 | 7/2008 | Graef et al. |
| 2009/0276689 A1 * | 11/2009 | Tan et al. ....................... 714/799 |

FOREIGN PATENT DOCUMENTS

| | | |
|---|---|---|
| WO | WO 2007/091797 | 8/2007 |

OTHER PUBLICATIONS

Zhong, "VLSI Architecture of LDPC Based Signal Detection and Coding System for Magnetic Recording Channel", Thesis, RPI, Troy, NY, pp. 1-95, May 2006.

Casado et al., Multiple-rate low-density parity-check codes with constant blocklength, IEEE Transations on Communications, Jan. 2009, vol. 57, pp. 75-83.

* cited by examiner

SYSTEMS AND METHODS FOR STEPPED DATA RETRY IN A STORAGE SYSTEM

BACKGROUND OF THE INVENTION

The present invention is related to storage media. More particularly, the present invention is related to systems and methods for identifying accessing data from a storage medium.

A typical storage medium includes a number of storage locations where data may be stored. Data is written to the medium within areas designated for user data by positioning a read/write head assembly over the medium at a particular location, and subsequently passing a modulated electric current through the head assembly such that a corresponding magnetic flux pattern is induced in the storage medium. To retrieve the stored data, the head assembly is positioned over a track containing the desired information and advanced until it is over the desired data. In this position, the previously stored magnetic flux pattern operates to induce a current in the head assembly. This induced current may then be converted to represent the originally recorded data. In some cases, data may not be retrievable from the storage medium due to, for example, media defects on the storage medium. This may lead to the permanent loss of data. As data may not be backed up on other systems, this loss can be costly where the data was valuable.

Hence, for at least the aforementioned reasons, there exists a need in the art for advanced systems and methods for accessing data from a storage medium.

BRIEF SUMMARY OF THE INVENTION

The present invention is related to storage media. More particularly, the present invention is related to systems and methods for identifying accessing data from a storage medium.

Various embodiments of the present invention provide data processing retry circuits that include a stepped erasure window register, and an erasure flag set circuit. The stepped erasure window register includes: an erasure flag location, an erasure flag length, and a step size. The erasure flag set circuit is operable to assert a first erasure flag beginning at the erasure flag location and having the erasure flag length at a first time. In addition, the erasure flag set circuit is operable to assert a second erasure flag beginning at the erasure flag location plus the step size, and having the erasure flag length at a second time.

In some instances of the aforementioned embodiments, the circuit further includes a data detection circuit that receives the first erasure flag and a series of data samples. The data detection circuit applies a data detection algorithm to the series of data samples using the first erasure flag during a data detection process. In some such instances, the data detection process is a first data detection process, the data detection circuit receives the second erasure flag, and the data detection circuit applies the data detection algorithm to the series of data samples using the second erasure flag during a second data detection process. In other such instances, the circuit is deployed in a hard disk drive that includes a storage medium, and the series of data samples is derived from the storage medium.

In yet other such instances, the data detection process is a second data detection process, and the data detection circuit further includes a media defect detector circuit that is operable to assert a third erasure flag at a third time. The third erasure flag corresponds to a media defect on the medium from which the series of data samples was derived. The first data detection process applies the data detection algorithm to the series of data samples using the third erasure flag during a first data detection process. In some cases, the erasure flag set circuit is operable to assert both the first erasure flag and the third erasure flag at the first time. In particular cases, the erasure flag set circuit is operable to assert both the second erasure flag and the third erasure flag at the second time. In various cases, the data processing circuit further includes a data buffer that stores the series of data samples. In such cases, the series of data samples to which the data detection algorithm is applied during the second data detection process are derived from the data buffer. In some cases, the series of data samples to which the data detection algorithm is applied during the first data detection process are accessed before being stored to the data buffer.

Other embodiments of the present invention provide methods for retry processing that include, receiving a series of data samples; buffering the series of data samples to yield a series of buffered data samples; performing a media defect detection on the series of data samples to yield a first erasure flag; applying a data detection algorithm to the series of data samples using the first erasure flag; and reapplying the data detection algorithm to the series of buffered data samples using a second erasure flag. Application of the data detection algorithm yields a detected output that fails to converge, and the second erasure flag corresponds to a segment of the buffered data samples defined by a erasure window register. In some cases, reapplying the data detection algorithm to the series of buffered data samples includes reapplying the data detection algorithm to the series of buffered data samples using both the second erasure flag and the first erasure flag.

In various cases, the detected output is a first detected output, and reapplying the data detection algorithm to the series of buffered data samples yields a second detected output that fails to converge. In such cases, the method further includes reapplying the data detection algorithm to the series of buffered data samples using a third erasure flag, and the third erasure flag is the second erasure flag moved relative to the buffered data samples by a step size defined by the erasure window register. In a particular instance, reapplying the data detection algorithm to the series of buffered data samples using the third erasure flag includes reapplying the data detection algorithm to the series of buffered data samples using both the third erasure flag and the first erasure flag.

In one or more cases, the detected output is a first detected output and the method further includes: modifying a media defect detection parameter that at least in part controls the sensitivity to identifying a media defect; re-performing the media defect detection on the series of data samples using the modified media defect parameter to yield a third erasure flag; and reapplying the data detection algorithm to the series of data samples using the third erasure flag to yield a second detected output that fails to converge. In some such cases, reapplying the data detection algorithm to the series of buffered data samples includes reapplying the data detection algorithm to the series of buffered data samples using both the second erasure flag and the third erasure flag.

In other cases, the detected output is a first detected output and the method further includes: modifying a media defect detection parameter that at least in part controls the sensitivity to identifying a media defect; re-performing the media defect detection on the series of buffered data samples using the modified media defect parameter to yield a third erasure flag; and reapplying the data detection algorithm to the series of buffered data samples using the third erasure flag to yield a second detected output that fails to converge. In some such cases, reapplying the data detection algorithm to the series of buffered data samples includes reapplying the data detection algorithm to the series of buffered data samples using both the second erasure flag and the third erasure flag.

Yet other embodiments of the present invention provide data storage systems that include a storage medium; a read/write head assembly disposed in relation to the storage medium; and a data processing circuit that receives an analog input from the read/write head assembly representing data derived from the storage medium. The data processing circuit includes: a stepped erasure window register having an erasure flag location, an erasure flag length, and a step size; and an erasure flag set circuit that is operable to assert a first erasure flag beginning at the erasure flag location and having the erasure flag length at a first time. In addition, the erasure flag set circuit is operable to assert a second erasure flag beginning at the erasure flag location plus the step size, and having the erasure flag length at a second time.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to storage media. More particularly, the present invention is related to systems and methods for identifying accessing data from a storage medium.

Various embodiments of the present invention provide systems and methods for performing data processing retries by re-processing buffered data using modified parameters. In particular, some embodiments of the present invention a stepped erasure window register is used to assert an erasure flag and retry processing of buffered data. Where processing fails to converge, the erasure flag is moved or stepped to a next incremental location relative to the buffered data and the buffered data is re-processed using the new erasure flag. This process of stepping the erasure flag across buffered data allows for performing a number of data processing retries using forced erasure flags to see if a data convergence is possible. In some cases, the stepped erasure flag is used in addition to any erasure flag generated during initial processing of the data that is ultimately buffered. In some cases, a static erasure window register is used that allows for forcing an erasure flag of defined length at a location relative to the buffered data. The data processing can then be retried using the forced static erasure flag.

Figure 1:
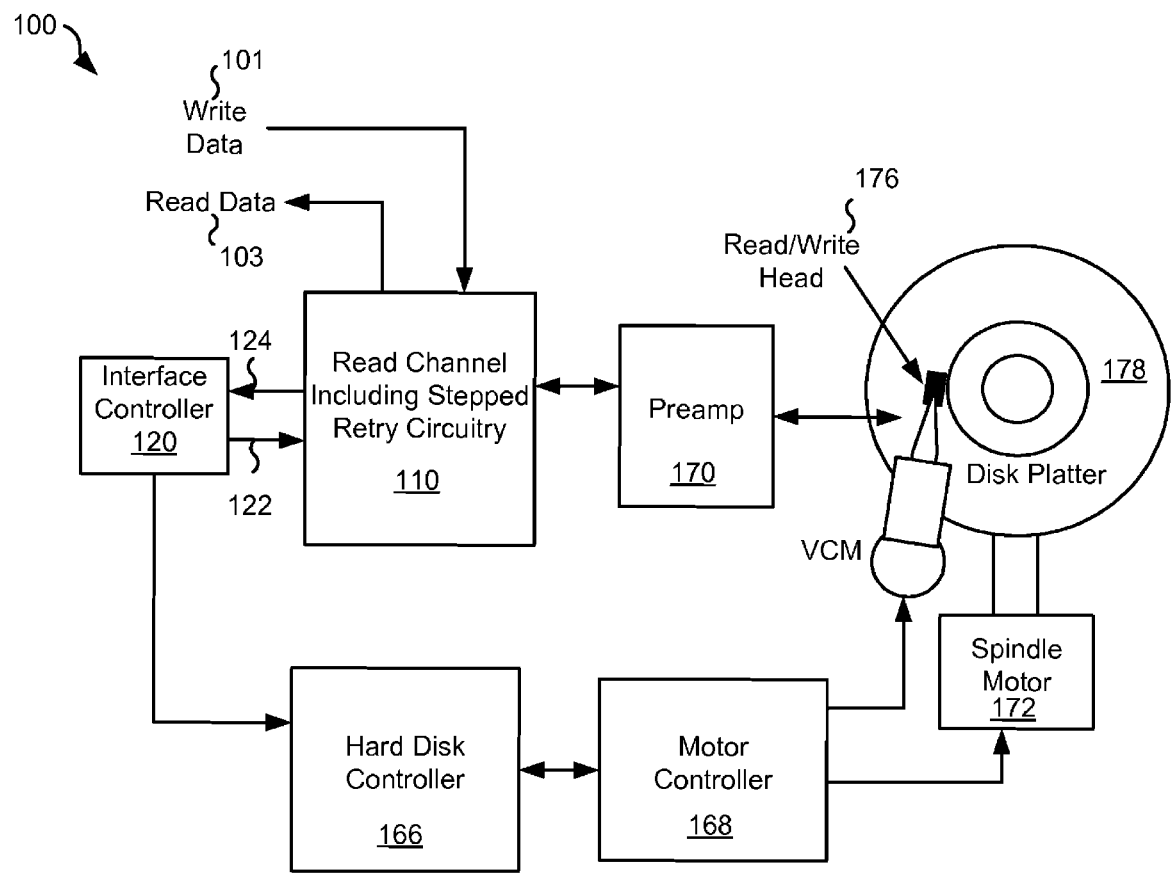
FIG. 1 shows a storage system including stepped retry circuitry in accordance with one or more embodiments of the present invention.

Turning to FIG. 1, a storage system 100 including a read channel circuit 110 with stepped retry circuitry in accordance with various embodiments of the present invention. Storage system 100 may be, for example, a hard disk drive. The incorporated stepped retry circuitry may be any circuitry capable of performing a stepped retry. Some examples of such stepped retry circuitry are discussed below in relation to FIG. 2, FIG. 3 and FIG. 4. Such stepped retry circuitry is capable of performing a number of virtual retries on buffered input data using user programmable parameters to isolate and/or correct any errors.

In addition to read channel 110, storage system 100 includes an interface controller 120, a preamp 170, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly 176 to the proper data track on disk platter 178 under the direction of hard disk controller 166. Spindle motor 172 spins disk platter 178 at a determined spin rate (RPMs).

Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel module 164 via preamp 170. Preamp 170 is operable to amplify the minute analog signals accessed from disk platter 178. In addition, preamp 170 is operable to amplify data from read channel module 110 that is destined to be written to disk platter 178. In turn, read channel module 110 decodes (including media defect detection) and digitizes the received analog signal to recreate the information originally written to disk platter 178. This data is provided as read data 103 to a receiving circuit. A write operation is substantially the opposite of the preceding read operation with write data 101 being provided to read channel module 110. This data is then encoded and written to disk platter 178.

Figure 2:
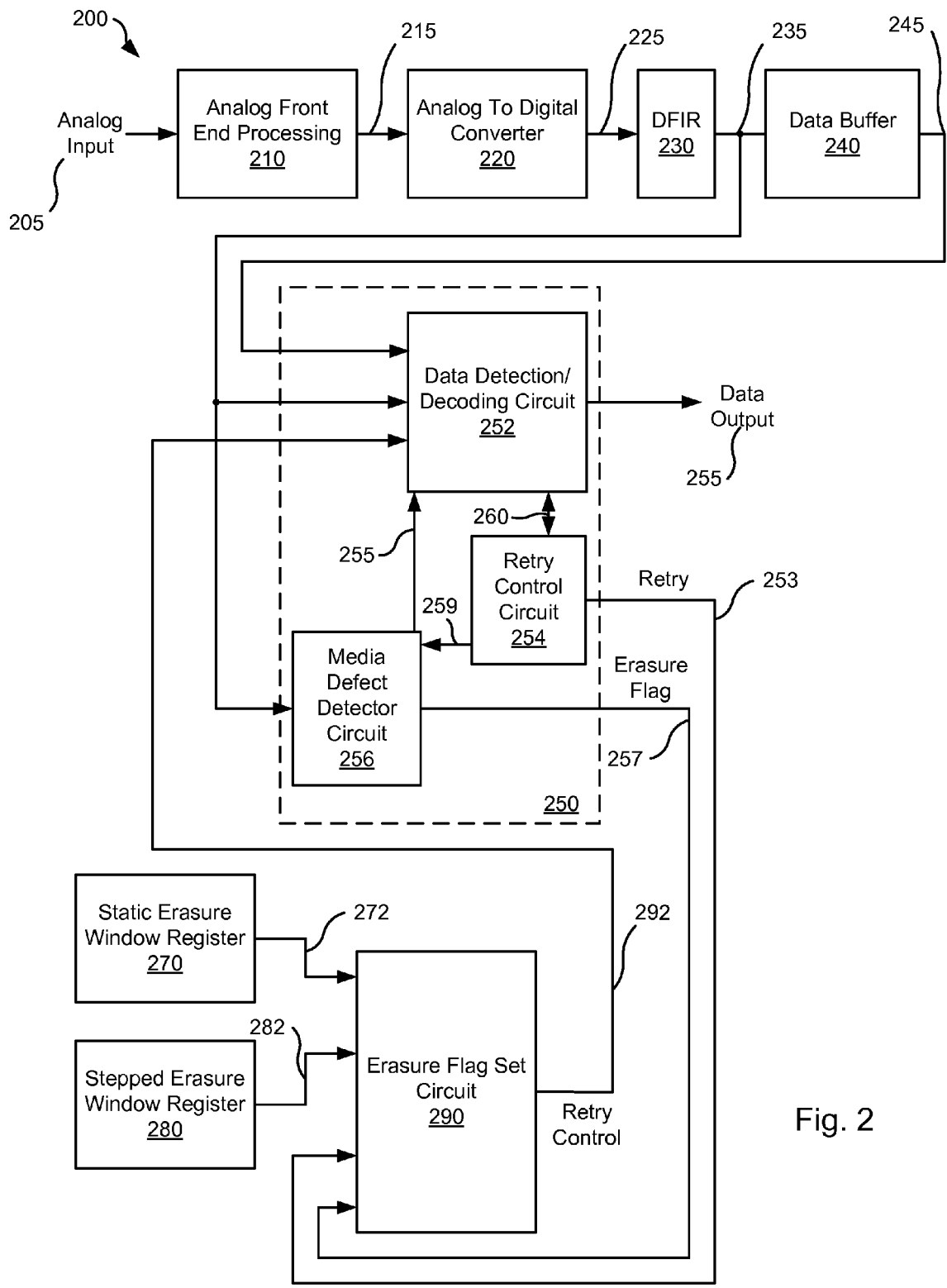
FIG. 2 shows a data processing system including a stepped retry circuit in accordance with some embodiments of the present invention.

Turning to FIG. 2, a data processing system 200 including a stepped retry circuit is shown in accordance with some embodiments of the present invention. Data processing system 200 includes an analog front end processing circuit 210 that receives an analog input 205. Analog front end processing circuit 210 may include a variety of analog processing circuitry capable of massaging analog input 205 into a useful signal that is provided as an analog processed input 215. In particular, analog front end processing circuit 210 may include, but is not limited to, an equalizer circuit, an amplifier circuit, and/or an analog filter circuit. Based upon the disclosure provided herein, one of ordinary skill in the art will recognize a variety of circuits that may be used in relation to different embodiments of the present invention.

Analog processed input 215 is provided to an analog to digital converter circuit 220 that samples the input at a sampling rate and provides a series of digital samples 225 to a digital finite impulse response filter 230. Analog to digital converter circuit 220 may be any circuit known in the art that is capable of converting an analog input signal into a corresponding series of digital samples. Digital finite impulse response filter 230 may be any digital finite impulse response filter known in the art. Digital finite impulse response filter 230 provides a filtered output 235 to both a data buffer 240 and to a data processing circuit 250. Data buffer 240 may be any storage device capable of buffering one or more sets of data. In some embodiments, a set of data is a full sector of data derived from a magnetic storage medium, and data buffer 240 is a non-volatile random access memory. In other cases, the data buffer is a dynamic random access memory. Based upon the disclosure provided herein, one of ordinary skill in the art will recognize a variety of storage devices that may be used in relation to different embodiments of the present invention. As more fully described below, the information stored in data buffer 240 may be used for one or more virtual data retry processes attempting to correct errors in digital samples 235 that were not correctable during initial or physical processing attempts. For the purposes of this document, the phrase "virtual data retry" refers to a data processing retry using buffered data, and the phrase "physical processing" refers to data processing done on data streamed from a data source.

Data processing circuit 250 includes a media defect detector circuit 256 as is known in the art. Media defect detector circuit 256 may be any circuit known in the art that is capable of performing a media defect detection on a data input. U.S. patent application Ser. No. 12/114,462 entitled "Systems and Methods for Media Defect Detection", and filed Apr. 29, 2008 by Tan et al.; and U.S. patent application Ser. No. 12/425,626 entitled "Systems and Methods for Multilevel Media Defect Detection", and filed Apr. 17, 2009 by Yang et al. each disclose some examples of data detection/decoding circuits that may be used in relation to different embodiments of the present invention. The entirety of the aforementioned patent applications is incorporated herein by reference for all purposes. Based upon the disclosure provided herein, one of ordinary skill in the art will recognize a variety of media defect detection circuits that may be used in relation to different embodiments of the present invention. Media defect detector circuit 256 receives filtered output 235 and performs a media defect detection on filtered output 235. The media defect detection process generates an erasure flag 257 that corresponds to the region of the detected media defect. Erasure flag 257 is also provided as an error indicator 258 to a data detection/decoding circuit 252. In addition, media defect detector circuit 256 receives a parameter input 259 from a retry control circuit 254 that allows for changing the operational parameters (e.g., the media defect threshold and/or defect window) of media defect detector circuit 256.

Data processing circuit 250 further includes a data detection/decoding circuit 252 as is known in the art. Data detection/decoding circuit 252 includes one or more data detection circuits that apply a data detection algorithm to the received data, and one or more decoding circuits that apply a data decoding algorithm to the received data. U.S. patent application Ser. No. 12/114,462 entitled "Systems and Methods for Queue Based Data Detection and Decoding", and filed May 2, 2008 by Yang et al. discloses some examples of data detection/decoding circuits that may be used in relation to different embodiments of the present invention. The entirety of the aforementioned patent application is incorporated herein by reference for all purposes. Based upon the disclosure provided herein, one of ordinary skill in the art will recognize a variety of data detection and/or data decoding circuits that may be used in relation to different embodiments of the present invention. Data detection/decoding circuit 252 provides a data output 255.

Convergence or non-convergence of data output 255 is reported as a control signal 260 to retry control circuit 254. Where data output 255 converges (i.e., data errors are corrected), it is provided as an output and retry control circuit 254 de-asserts a retry output signal 253 indicating that no retry is desired. In addition, retry control circuit 254 resets the value of parameter input 259 that is provided to media defect detector circuit 256.

Otherwise, where data output 255 fails to converge, one or more different retry processes may be triggered. For example, in one embodiment of the present invention, another physical processing attempt is made using different media defect parameters. In such a case, updated parameters are provided to media defect detector circuit 256 via parameter input 259. The updated parameters may be selected to detect additional media defects that were not previously detected. As an example, the threshold for identifying a media defect may be lowered. This provides a greater opportunity to detect a media defect, but at the cost of an increased potential of misidentifying media defects. Using the new media defect parameters, a physical retry is started where data is re-introduced via analog input 205 and re-processed. Where the second re-processing fails to converge, a virtual retry is triggered by asserting retry output signal 253. Alternatively, in another embodiment of the present invention, a virtual retry is triggered whenever data output 255 fails to converge. In such a case, retry control circuit 254 asserts retry output signal 253 and resets the value of parameter input 259 that is provided to media defect detector circuit 256 whenever a failure to converge is indicated by data detection/decoding circuit 252.

When retry output signal 253 is asserted, a virtual retry is started. The virtual retry includes providing one or more erasure flags as a retry control signal 292 to data detection/decoding circuit 252. The one or more erasure flags are used by data detection/decoding circuit 252 when processing buffered data 245 accessed from data buffer 240. By processing data that has been stored to data buffer 240 a large number of retries may be performed in the time that it would take to perform a single physical retry. Retry control signal 292 is generated by an erasure flag set circuit 290 that asserts erasure flags corresponding to erasure flag 257, an output 272 from a user programmable static erasure window register 270, and/or an output 282 from a stepped erasure window register 280.

For example, where multiple physical retries were performed that in some cases used modified values of parameter input 259, erasure flag 257 is not used and both output 272 and output 282 are used to set an erasure flag that is provided as retry control signal 292. Where use of output 272 in the retry process is not desired, the window length is set to zero. This provides an ability to use only output 282. Alternatively, where physical retries were previously performed without modifying the values of parameter input 259, erasure flag 257 is provided along with both of output 272 and output 282 in generating the erasure flags provided as retry control signal 292. Again, where use of output 272 in the retry process is not desired, the window length is set to zero. This provides an ability to use both erasure flag 257 and output 282. Two graphical examples of erasure flags corresponding to retry control signal 292 are discussed below in relation to FIG. 4a and FIG. 4b. Based upon the disclosure provided herein, one of ordinary skill in the art will recognize a number of other examples that are possible in accordance with different embodiments of the present invention.

Static erasure window register 270 indicates a location (a count within a series of digital samples provided as buffered data 245) at which an erasure flag is to be asserted, and a length (i.e., a number of the series of digital samples provided as buffered data 245) over which the erasure flag is to be asserted. Stepped erasure window register 280 indicates a location (a count within a series of digital samples provided as buffered data 245) at which an erasure flag is to be asserted, a length (i.e., a number of the series of digital samples provided as buffered data 245) over which the erasure flag is to be asserted, and a step size. An erasure pointer generated from stepped erasure window register is designed to be moved or stepped across the length of buffered data on successive data retries. Accordingly, on the first retry, the erasure flag is asserted at the indicated location and for the indicated length of buffered data. On the next retry (where another retry is called for), the erasure flag is asserted at the indicated location plus the step size, and for the indicated length of buffered data. On another subsequent retry, the erasure flag is asserted at the indicated location plus two times the step size, and for the indicated length of buffered data. This process continues until either a maximum number of retires have been performed, the data converges, or until the erasure flag is stepped beyond the end of buffered data 245.

In operation where physical retries are limited to conservative values of parameter input 259, only static erasure flags are selected, and data output 255 fails to converge after physical decoding, retry control 292 indicates a first erasure flag at the location indicated by erasure flag 257 and a second erasure flag at a starting location and length indicated by output 272. With both of these erasure flags set, buffered data 245 from data buffer 240 is re-processed through data detection/ decoding circuit 252. Where the data processing converges, data output 255 is provided. Otherwise an error is indicated. Use of an erasure pointer generated by static erasure window register 270 indicates the performance of a single retry.

In operation, where physical retries are limited to conservative values of parameter input 259, a stepped erasure flag is selected, and data output 255 fails to converge after physical decoding, retry control 292 indicates a first erasure flag at the location indicated by erasure flag 257 and a second erasure flag at a starting location and length indicated by output 282. With both of these erasure flags set, buffered data 245 from data buffer 240 is re-processed through data detection/decoding circuit 252. Where the data processing converges, data output 255 is provided. Otherwise, the erasure flag corresponding to output 282 is moved by a step size to a subsequent location relative to buffered data 245. With both of these erasure flags set, buffered data 245 from data buffer 240 is re-processed through data detection/decoding circuit 252. This process of stepping the erasure flag corresponding to output 282 continues until data output 255 converges, a maximum number of retries is performed, or until the erasure flag corresponding to output 282 is stepped beyond the end of buffered data 245.

In operation where physical retries are done by changing the values of parameter input 259, only static erasure flags are selected, and data output 255 fails to converge after physical decoding, retry control 292 indicates only an erasure flag at a starting location and length indicated by output 272. With this single erasure flag set, buffered data 245 from data buffer 240 is re-processed through data detection/decoding circuit 252. Where the data processing converges, data output 255 is provided. Otherwise an error is indicated. Again, use of an erasure pointer generated by static erasure window register 270 indicates the performance of a single retry.

In operation, where physical retries are done by changing the values of parameter input 259, a stepped erasure flag is selected, and data output 255 fails to converge after physical decoding, retry control 292 indicates only an erasure flag at a starting location and length indicated by output 282. With this single erasure flag set, buffered data 245 from data buffer 240 is re-processed through data detection/decoding circuit 252. Where the data processing converges, data output 255 is provided. Otherwise, the erasure flag corresponding to output 282 is moved by a step size to a subsequent location relative to buffered data 245. With this single erasure flag set, buffered data 245 from data buffer 240 is re-processed through data detection/decoding circuit 252. This process of stepping the erasure flag corresponding to output 282 continues until data output 255 converges, a maximum number of retries is performed, or until the erasure flag corresponding to output 282 is stepped beyond the end of buffered data 245.

In yet another operation, the media defect threshold is increased (i.e. parameter input 259 is modified). In this mode, most defects are identified, however, various false alarms (i.e., unflawed regions are identified as defective) may occur. In this mode, only erasure flags occurring within the regions identified by one or the other of output 272 and 282 are accepted. Said another way, any assertion of erasure flag 257 falling outside of the region identified by output 272 and output 282 are ignored, while assertions of erasure flag 257 falling within the region identified by either output 272 and output 282 are utilized.

Figure 3A:
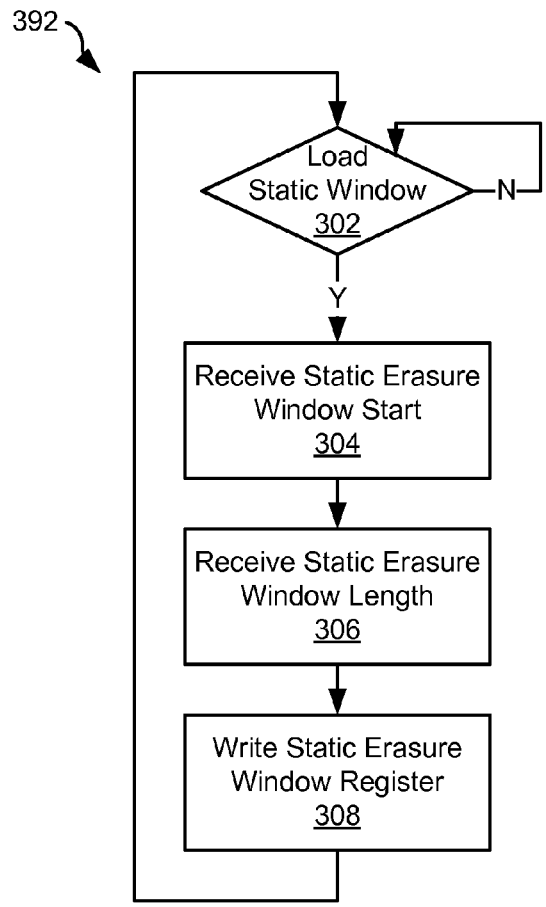
FIG. 3a is a flow diagram showing a process for setting up a stepped retry circuit in accordance with various embodiments of the present invention.

Turning to FIG. 3a, a flow diagram 392 shows a process for setting up a static retry in accordance with one or more embodiments of the present invention. Following flow diagram 392, it is determined whether a static erasure window register is to be loaded (block 302). This may be determined, for example, by the assertion of a write signal or via a programmable interface. Based upon the disclosure provided herein, one of ordinary skill in the art will recognize a variety of possible load indicators. Where a load is indicated (block 302), a start location for the static erasure window is received (block 304) along with a length of the static erasure window (block 306). The received start location and the length are written to the static erasure window register (block 308).

Figure 3B:
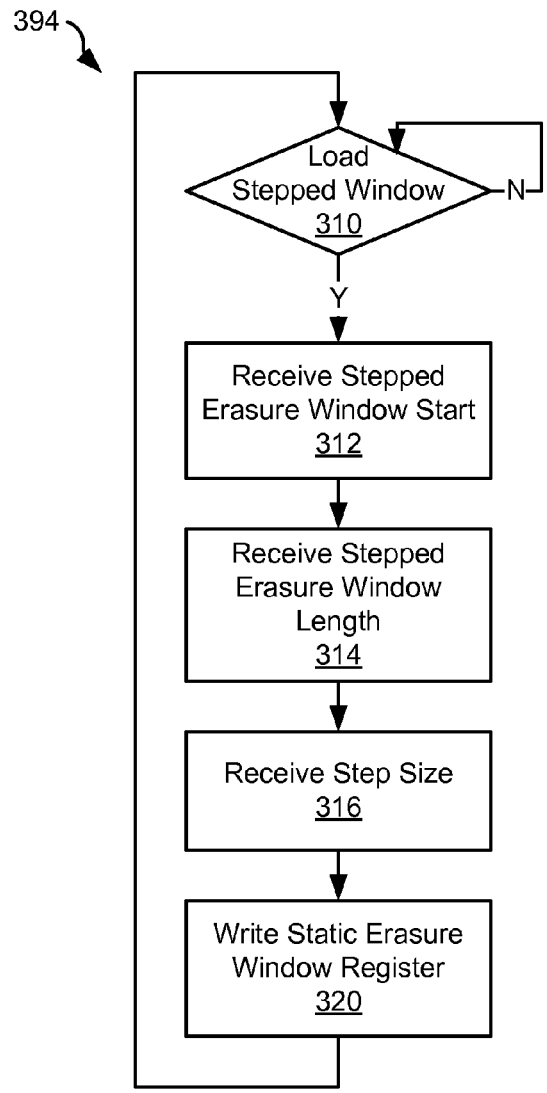
FIG. 3b is a flow diagram showing a process for setting up a stepped retry circuit in accordance with various embodiments of the present invention.

Turning to FIG. 3b, a flow diagram 394 shows a process for setting up a stepped retry in accordance with one or more embodiments of the present invention. Following flow diagram 394, it is determined whether a stepped erasure window register is to be loaded (block 310). This may be determined, for example, by the assertion of a write signal or via a programmable interface. Based upon the disclosure provided herein, one of ordinary skill in the art will recognize a variety of possible load indicators. Where a load is indicated (block 310), a start location for the stepped erasure window is received (block 312) along with a length of the stepped erasure window (block 314) and a step size (block 316). The received start location, length, and step size are written to the stepped erasure window register (block 320).

Figure 3C:
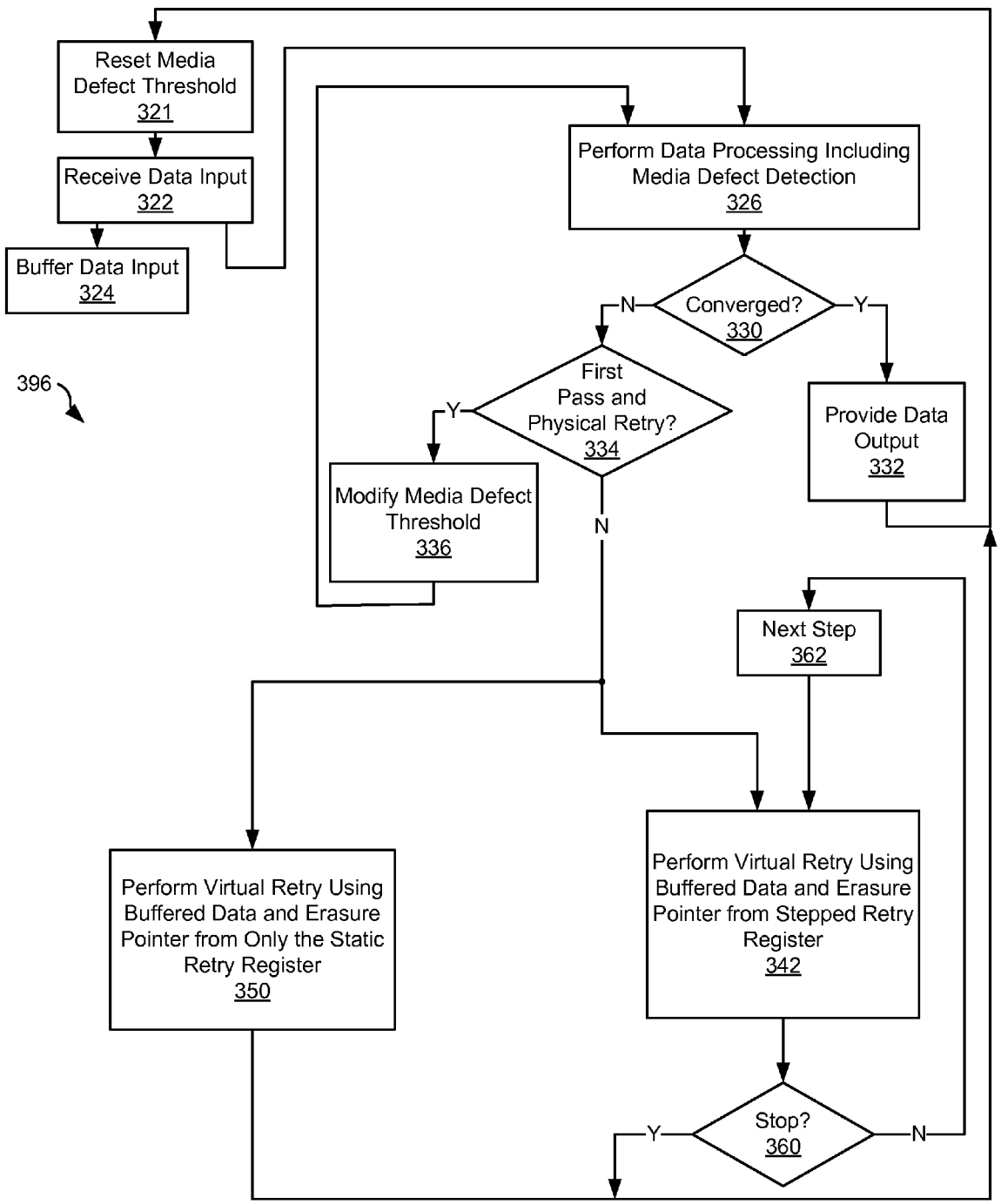
FIG. 3c is a flow diagram showing a method in accordance with some embodiments of the present invention for performing a retry.
Figure 3D:
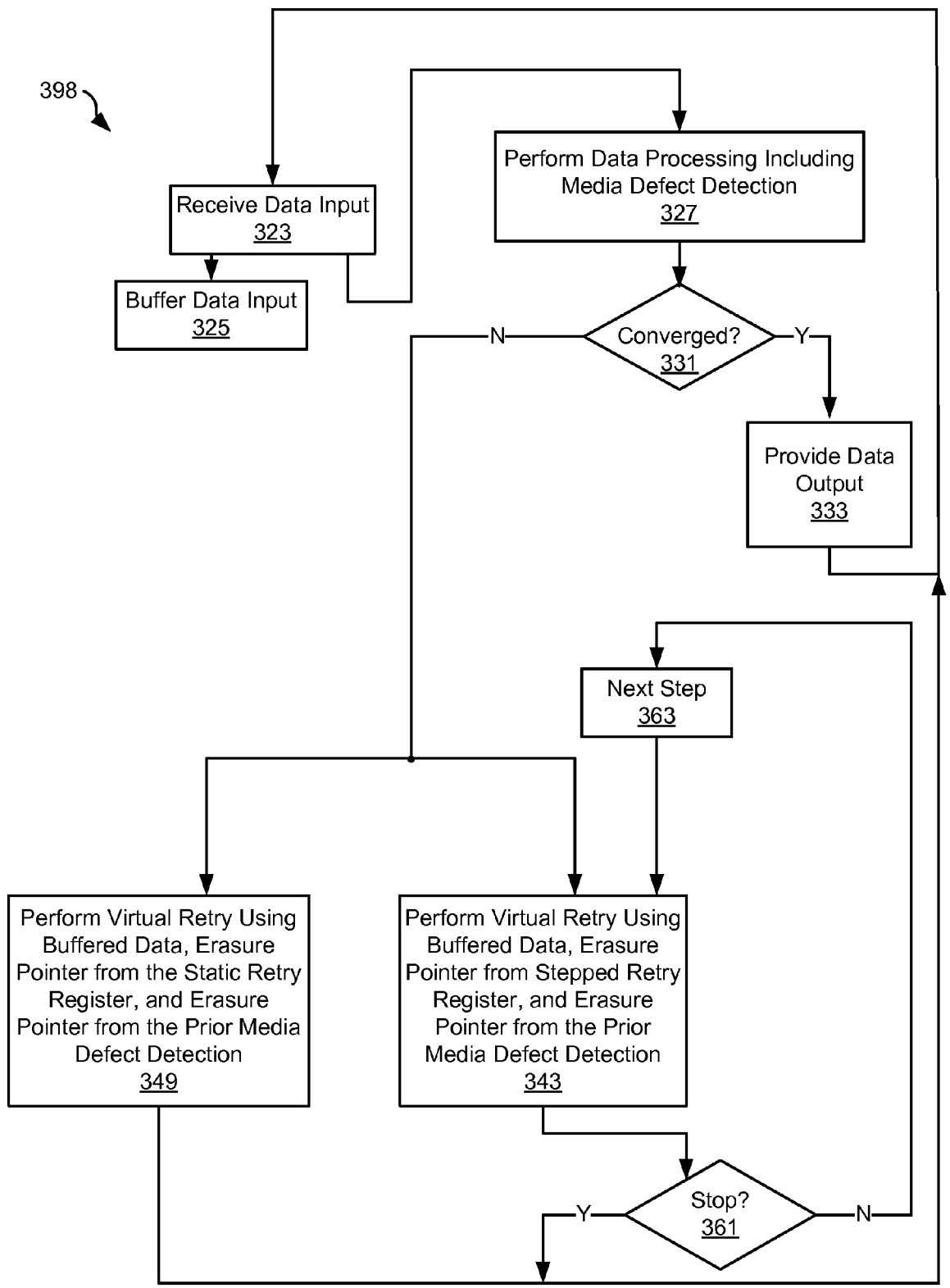
FIG. 3d is a flow diagram showing a method in accordance with other embodiments of the present invention for performing a retry.

Turning to FIG. 3c, a flow diagram 396 showing a method in accordance with some embodiments of the present invention for performing a data processing retry. Following flow diagram 396, a media defect threshold is reset to an initial level (block 321). The initial media defect threshold is set low enough to allow for detecting most media defects, but high enough to avoid most misdetections of a media defect. Data is received from a data source (block 322). The data source may be, for example, a magnetic storage medium and any intervening processing circuitry. Based upon the disclosure provided herein, one of ordinary skill in the art will recognize other source for the data input. The data input is stored to a data buffer (block 324). The data buffer may be any circuit capable of storing information such as a non-volatile random access memory or a dynamic random access memory.

The receive data is then processed including media defect detection (block 326). This data processing may include, but is not limited to, performing a data detection process and a data decoding process on the received data. In addition, a media defect detection process is performed to determine whether the region from which the received data was derived is defective. Where a defect is detected, an erasure pointer is asserted causing the data processing to process the data from the defective region differently. The combination of data processing and media defect detection may be done using any approaches known in the art. When the data processing completes, it is determined whether the data processing converged (block 330). Where the data processing converged (block 330), the resulting data output is provided (block 332).

Alternatively, where the data processing failed to converge (block 330), it is determined whether the data processing was both a first pass and a physical retry (block 334). Where it is both a first pass and a physical retry (block 334), the media defect threshold is modified (block 336). The media defect threshold may be modified such that a greater number of media defects are detected at the expense of an increased probability of misdetection. After modifying the media defect threshold (block 336), the data processing is retried to determine if it converges with the modified media defect threshold. This retry may be performed on the received data that was earlier buffered (block 324), or may be performed by re-accessing the data from the data source.

Alternatively, where it is not the first pass and a physical retry (block 334) an erasure pointer is generated based upon the start location value and length value from a static erasure window register, and a virtual retry is performed using the generated static erasure pointer (block 350). Once the virtual retry is completed (block 350), the process completes. In addition, an erasure pointer is generated based upon the start location value and length value from a stepped erasure window register, and a virtual retry is performed using the generated stepped erasure pointer (block 342). Once the retry is completed (block 342), it is determined whether a stop condition is met (block 360). A stop condition may be completion of a maximum number of virtual retries, the erasure window extending beyond the end of the buffered data, or a convergence of the data by the data processing. Where a stop condition is met (block 360), the process completes. Alternatively, where a stop condition is not met (block 360), the step size from the stepped erasure window register is added to the previous starting location for the stepped erasure pointer (block 362). The length from the stepped erasure window register and the new starting location are used to generate a stepped erasure pointer, and the data processing is retried on the buffered data using the stepped erasure pointer (block 342). This stepping of the stepped erasure pointer continues until a stop condition is met (block 360).

Turning to FIG. 3b, a flow diagram 398 showing another method in accordance with some embodiments of the present invention for performing a data processing retry. Following flow diagram 398, data is received from a data source (block 323). The data source may be, for example, a magnetic storage medium and any intervening processing circuitry. Based upon the disclosure provided herein, one of ordinary skill in the art will recognize other source for the data input. The data input is stored to a data buffer (block 325). The data buffer may be any circuit capable of storing information such as a non-volatile random access memory or a dynamic random access memory.

The receive data is then processed including media defect detection (block 327). This data processing may include, but is not limited to, performing a data detection process and a data decoding process on the received data. In addition, a media defect detection process is performed to determine whether the region from which the received data was derived is defective. Where a defect is detected, an erasure pointer is asserted causing the data processing to process the data from the defective region differently. The combination of data processing and media defect detection may be done using any approaches known in the art. When the data processing completes, it is determined whether the data processing converged (block 331). Where the data processing converged (block 331), the resulting data output is provided (block 333).

Alternatively, where the data processing failed to converge (block 331), an erasure pointer is generated based upon the start location value and length value from a static erasure window register, and a virtual retry is performed using the generated static erasure pointer and the erasure pointer(s) generated as part of the media defect detection of block 327 (block 349). Once the virtual retry is completed (block 349), the virtual retry process completes. In addition, an erasure pointer is generated based upon the start location value and length value from a stepped erasure window register, and a virtual retry is performed using the generated stepped erasure pointer and the erasure pointer(s) generated as part of the media defect detection of block 327 (block 343). Once the retry is completed (block 343), it is determined whether a stop condition is met (block 361). A stop condition may be completion of a maximum number of virtual retries, the erasure window extending beyond the end of the buffered data, or a convergence of the data by the data processing. Where a stop condition is met (block 361), the virtual retry process completes. Alternatively, where a stop condition is not met (block 361), the step size from the stepped erasure window register is added to the previous starting location for the stepped erasure pointer (block 363). The length from the stepped erasure window register and the new starting location are used to generate a stepped erasure pointer, and the data processing is retried on the buffered data using the stepped erasure pointer (block 343). This stepping of the stepped erasure pointer continues until a stop condition is met (block 361).

Figure 4A:
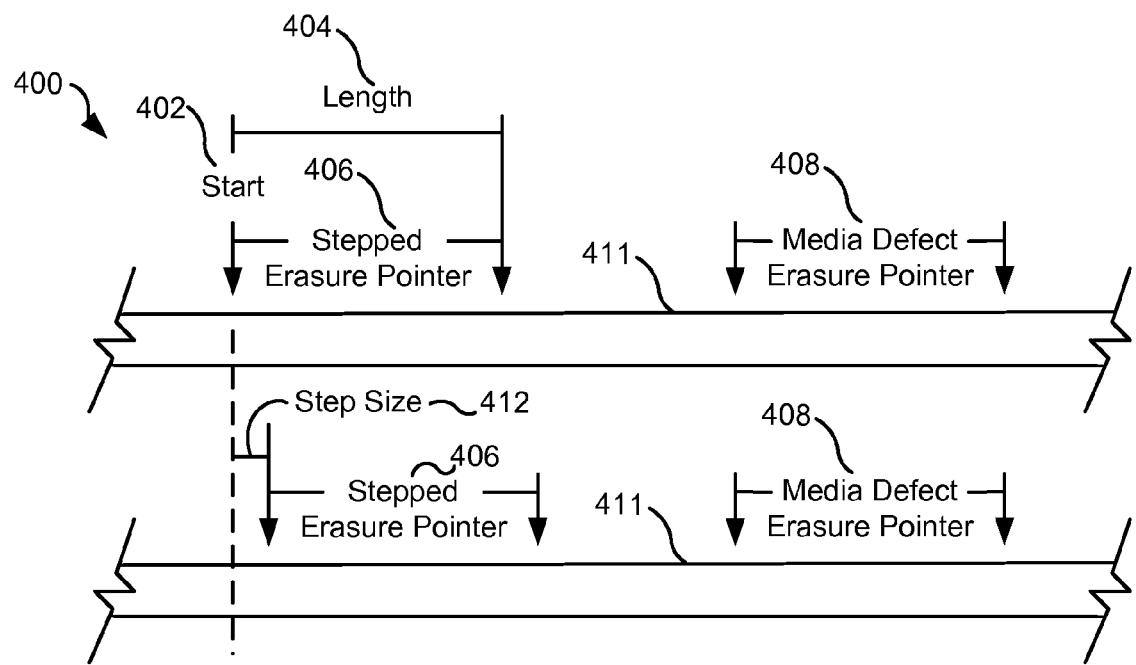
FIG. 4a graphically depicts a stepped retry after a single pass data processing failure in accordance with various embodiments of the present invention.

Turning to FIG. 4a, a graphical depiction 400 shows a stepped retry after a single pass data processing failure where one or more erasure pointers earlier generated by the media defect detector. As shown, a series of digital samples 410 have an erasure pointer 406 generated from a stepped erasure window register and an erasure pointer 408 that was created by a media defect detector during an earlier data processing of the data set. Erasure pointer 406 begins at a start location 402 that corresponds to a point within digital samples 410 and extends a length 404 from start location 402. The location and length of erasure pointer 408 is determined and fixed by a media defect detection circuit. After virtual retry processing digital samples 410 using both erasure pointer 406 and erasure pointer 408 completes, erasure pointer 406 is moved by a step size 412 further along digital samples 410. Of note, erasure pointer 408 remains in the same location as erasure pointer 406 is stepped along digital samples 410. It should be noted that one or more erasure pointers corresponding to media defect detections may be used in addition to any erasure pointer generated based upon values in the stepped erasure window register.

Figure 4B:
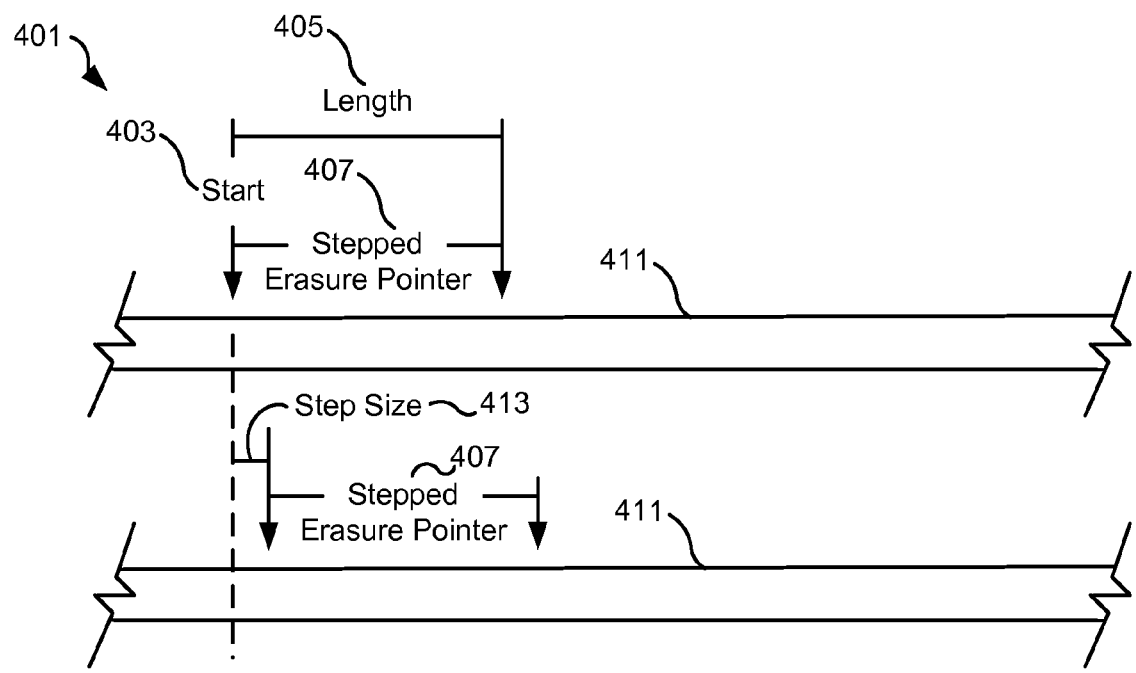
FIG. 4b graphically depicts a stepped retry after a multiple pass data processing failure in accordance with various embodiments of the present invention.

Turning to FIG. 4b, a graphical depiction 401 shows a stepped retry after a multiple pass data processing failure that included a change to media defect detection thresholds during earlier processing. As shown, a series of digital samples 411 have an erasure pointer 407 generated from a stepped erasure window register. Erasure pointer 407 begins at a start location 403 that corresponds to a point within digital samples 411 and extends a length 405 from start location 403. After virtual retry processing digital samples 410 using erasure pointer 407 completes, erasure pointer 407 is moved by a step size 413 further along digital samples 411.

In conclusion, the invention provides novel systems, devices, methods and arrangements for isolating and/or correcting data errors associated with storage media. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing retry circuit, the circuit comprising:
    a stepped erasure window register, wherein the stepped erasure window register includes: an erasure flag location, an erasure flag length, and a step size; and
    an erasure flag set circuit, wherein the erasure flag set circuit is operable to assert a first erasure flag beginning at the erasure flag location and having the erasure flag length at a first time, and wherein the erasure flag set circuit is operable to assert a second erasure flag beginning at the erasure flag location plus the step size, and having the erasure flag length at a second time.

2. The data processing retry circuit of claim 1, wherein the circuit further comprises:
    a data detection circuit, wherein the data detection circuit receives the first erasure flag and a series of data samples, and wherein the data detection circuit applies a data detection algorithm to the series of data samples using the first erasure flag during a data detection process.

3. The data processing retry circuit of claim 2, wherein the data detection process is a first data detection process, wherein the data detection circuit receives the second erasure flag, and wherein the data detection circuit applies the data detection algorithm to the series of data samples using the second erasure flag during a second data detection process.

4. The data processing retry circuit of claim 2, wherein the circuit is deployed in a hard disk drive, wherein the hard disk drive includes a storage medium, and wherein the series of data samples is derived from the storage medium.

5. The data processing retry circuit of claim 2, wherein the data detection process is a second data detection process, wherein the data detection circuit further includes:
    a media defect detector circuit, wherein the media defect detector circuit is operable to assert a third erasure flag at a third time, and wherein the third erasure flag corresponds to a media defect on the medium from which the series of data samples was derived; and
    wherein a first data detection process applies the data detection algorithm to the series of data samples using the third erasure flag during a first data detection process.

6. The data processing retry circuit of claim 5, wherein the erasure flag set circuit is operable to assert both the first erasure flag and the third erasure flag at the first time.

7. The data processing retry circuit of claim 6, wherein the erasure flag set circuit is operable to assert both the second erasure flag and the third erasure flag at the second time.

8. The data processing retry circuit of claim 5, wherein the data processing circuit further comprises:
    a data buffer, wherein the data buffer stores the series of data samples; and
    wherein the series of data samples to which the data detection algorithm is applied during the second data detection process are derived from the data buffer.

9. The data processing retry circuit of claim 8, wherein the series of data samples to which the data detection algorithm is applied during the first data detection process are accessed before being stored to the data buffer.

10. The data processing retry circuit of claim 8, wherein the circuit further comprises:
    an analog to digital converter;
    a digital filter; and
    wherein the analog to digital converter receives an analog input and provides a corresponding series of digital values, wherein the digital filter filters the series of digital values to yield the series of data samples, and wherein the series of data samples to which the data detection algorithm is applied during the first data detection process are accessed from the digital filter.

11. A method for retry processing, the method comprising:
    receiving a series of data samples;
    buffering the series of data samples to yield a series of buffered data samples;
    performing a media defect detection on the series of data samples to yield a first erasure flag;
    applying a data detection algorithm to the series of data samples using the first erasure flag, wherein application of the data detection algorithm yields a detected output that fails to converge; and
    reapplying the data detection algorithm to the series of buffered data samples using a second erasure flag, wherein the second erasure flag corresponds to a segment of the buffered data samples defined by a erasure window register.

12. The method of claim 11, wherein reapplying the data detection algorithm to the series of buffered data samples includes reapplying the data detection algorithm to the series of buffered data samples using both the second erasure flag and the first erasure flag.

13. The method of claim 11, wherein the detected output is a first detected output, wherein reapplying the data detection algorithm to the series of buffered data samples yields a second detected output that fails to converge, and wherein the method further comprises:
    reapplying the data detection algorithm to the series of buffered data samples using a third erasure flag, wherein the third erasure flag is the second erasure flag moved relative to the buffered data samples by a step size defined by the erasure window register.

14. The method of claim 13, wherein reapplying the data detection algorithm to the series of buffered data samples using the third erasure flag includes reapplying the data detection algorithm to the series of buffered data samples using both the third erasure flag and the first erasure flag.

15. The method of claim 11, wherein the detected output is a first detected output, and wherein the method further comprises:
modifying a media defect detection parameter, wherein the media defect detection parameter at least in part controls the sensitivity to identifying a media defect;
re-performing the media defect detection on the series of data samples using the modified media defect parameter to yield a third erasure flag; and
reapplying the data detection algorithm to the series of data samples using the third erasure flag to yield a second detected output that fails to converge.

16. The method of claim 15, wherein reapplying the data detection algorithm to the series of buffered data samples includes reapplying the data detection algorithm to the series of buffered data samples using both the second erasure flag and the third erasure flag.

17. The method of claim 11, wherein the detected output is a first detected output, and wherein the method further comprises:
modifying a media defect detection parameter, wherein the media defect detection parameter at least in part controls the sensitivity to identifying a media defect;
re-performing the media defect detection on the series of buffered data samples using the modified media defect parameter to yield a third erasure flag; and
reapplying the data detection algorithm to the series of buffered data samples using the third erasure flag to yield a second detected output that fails to converge.

18. The method of claim 17, wherein reapplying the data detection algorithm to the series of buffered data samples includes reapplying the data detection algorithm to the series of buffered data samples using both the second erasure flag and the third erasure flag.

19. A data storage system, the system comprising:
a storage medium;
a read/write head assembly disposed in relation to the storage medium; and
a data processing circuit, wherein the data processing circuit receives an analog input from the read/write head assembly representing data derived from the storage medium, and wherein the data processing circuit includes:
a stepped erasure window register, wherein the stepped erasure window register includes: an erasure flag location, an erasure flag length, and a step size; and
an erasure flag set circuit, wherein the erasure flag set circuit is operable to assert a first erasure flag beginning at the erasure flag location and having the erasure flag length at a first time, and wherein the erasure flag set circuit is operable to assert a second erasure flag beginning at the erasure flag location plus the step size, and having the erasure flag length at a second time.

20. The data storage system of claim 19, wherein the circuit further comprises:
a data detection circuit, wherein the data detection circuit receives the first erasure flag and a series of data samples, and wherein the data detection circuit applies a data detection algorithm to the series of data samples using the first erasure flag during a data detection process.

* * * * *